United States Patent Office 3,578,710
Patented May 11, 1971

1

3,578,710
DIHALOCYCLOPROPANE DERIVATIVES
Herman A. Bruson, Woodbridge, and Howard L. Plant,
Milford, Conn., assignors to Olin Corporation
No Drawing. Filed Sept. 30, 1968, Ser. No. 763,910
Int. Cl. C07c *143/70*
U.S. Cl. 260—543                                    2 Claims

ABSTRACT OF THE DISCLOSURE

Novel halosulfonyl derivatives are prepared by reacting a halosulfonic acid with a 1,1-dihalo-2-phenylcyclopropane compound. These derivatives are useful as pesticides and, in addtion, may be utilized in preparing a variety of valuable pharmaceutical products.

---

This invention relates to novel dihalocyclopropane derivatives and to a method for their preparation. More particularly, this invention relates to halosulfonyl derivatives of 1,1-dihalo-2-phenylcyclopropanes.

The novel dihalocyclopropane derivatives of this invention have the formula:

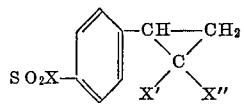

wherein X, X', and X'' are independently selected from the group consisting of chlorine and bromine.

Preparation of the novel compounds of this invention is accomplished by reacting a halosulfonic acid, such as $HOSO_2Cl$ with a 1,1-dihalo-2-phenylcyclopropane, such as:

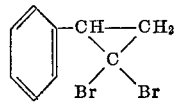

The reaction proceeds as shown in the following equation:

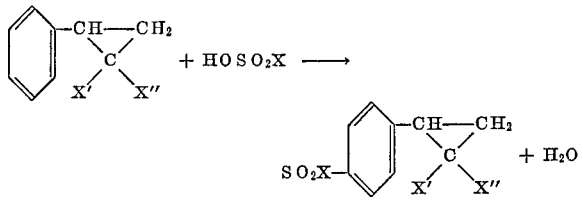

wherein X, X', and X'' have the same meaning as previously described.

Generally from about 1 to 10.0 moles of the halosulfonic acid are reacted with 1 mole of the 1,1-dihalo-2-phenylcyclopropane utilized. Preferably, however, about 3 to about 8 moles of the halosulfonic acid are reacted with each mole of the starting 1,1-dihalo-2-phenylcyclopropane. The reaction temperature, which, likewise, can be varied over a wide range, generally, will be from about 0° to about +100° C. and preferably will be from about 2° to about 85° C. Depending upon the reaction conditions selected, the time of reaction will vary from about 0.2 to about 6 hours or more. Recovery of the product from the reaction mixture can be accomplished in a number of ways well known in the art. For example, the reaction mixture can, after it has been allowed to cool to room temperature, be poured with vigorous stirring into a large quantity of cold water resulting in precipitation of the product. Final recovery is then carried out by washing by decantation with several additional portions of water, filtering and finally vacuum drying. The product is a gray, amorphous material which is obtained in yields of 80–90 percent or more. The product in pure form can be obtained by recrystallization from aromatic solvents such as benzene, toluene, etc.

The novel compounds of this invention are useful for a wide variety of purposes such as in the synthesis of pharmaceutical compositions and as pesticides.

The solid products of this invention can be utilized as flame retardants in plastics, such as polyethylene, polypropylene, polyvinyl chloride, etc. For example, from about 2 to about 12 percent by weight of 4'-(2,2-dichlorocyclopropyl)benzene sulfonylchloride formed in Example I can be blended with polyethylene or with polyethylene and about 5 percent by weight of paraffin wax to yield products with highly-improved flame resistance properties. Any suitable process can be used for preparing the blends such, for example, as Banbury mixers, extrusion mixers, roll mills or solution blending processe well known in the art. The ultimate products can be formed from such blends by solution casting, extrusion molding, pressure molding and the like. Form supported or unsupported films, rods or other shapes can be prepared.

The 1,1-dihalo-2-phenylcyclopropane starting materials for the method of this invention can be conveniently prepared by the process set forth in U.S. Pat. 3,376,349. For example, the compound 1,1-dichloro-2-phenylcyclopropane can be prepared as follows:

A mixture of 104 g. styrene, 120 g. of chloroform, 120 g. sodium hydroxide, 10 g. of water and 100 ml. of tertiary amyl alcohol is rapidly stirred and heated under reflux at 90–97° C. for 35 minutes. At this point the mixture contains about 1.5 moles of water, and the conversion to the dichlorocarbene adduct is about 60 percent of theory based on the styrene charged.

An additional quantity of 60 g. (0.5 mole) of chloroform and 40 g. (1 mole) of sodium hydroxide is added to the cooled product. The reaction mixture is rapidly stirred and then reheated to 101° C. under reflux during a period of about 45 minutes. Upon cooling, pouring into 500 ml. of water, and working up the water-insoluble layer by distillation under reduced pressure, the yield of 1,1-dichloro-2-phenylcyclopropane obtained (boiling at 77–79° C./2 mm.; $n_D^{25}$ 1.5505) is about 153 g. or 82 percent of theory, based on the styrene charged.

In a like manner, the compound 1,1-dibromo-2-phenylcyclopropane can be prepared as described above by reacting bromoform, styrene, and sodium hydroxide in the presence of water and tertiary amyl alcohol with rapid stirring and heating under reflux. Other styrene adducts useful as starting materials in the same manner as described above include 1,1-dibromo-2-phenylcyclopropane, 1-chloro-1-bromo-2-phenylcyclopropane, etc.

Specific embodiments of this invention are set forth in the examples which are to be considered not limitative.

EXAMPLE I 1,1-dichloro-2-phenylclopropane in the amount of 0.4 mole was slowly added at 10–15° C. to 1.4 moles of chlorosulfonic acid over a period of thirty minutes. After the addition had been completed the reaction mixture was heated to 60° C. and stirred for three hours. Next the mixture was cooled and poured and vigorous stirring into 700 grams of cold water. The product was washed by decantation with several additional portions of water, filtered and vacuum dried to yield 4'-(2,2-dichlorocyclopropyl)benzene sulfonylchloride of the formula:

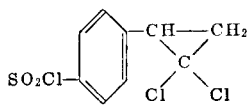

a gray, amorphous material. The yield was about 80–90 percent of the theoretical quantity.

EXAMPLES II–VII

A number of additional examples were carried out in the same manner and with the same apparatus as employed in Example I. Pertinent details relating to these examples are set forth in Table 1 which follows:

What is claimed is:
1. A compound of the formula:

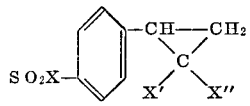

wherein X, X' and X'' are independently selected from the group consisting of chlorine and bromine with the proviso that X' and X'' are either both chlorine or both bromine.

2. A compound of claim 1 wherein X, X' and X'' are chlorine.

TABLE I

| Example | Moles A[1] | Moles HOSO$_2$Cl | Addition temp. (°C.) | Stirring temp. (°C.) | Addition time, minutes | Stirring time, hours | Yield (percent) | Remarks |
|---|---|---|---|---|---|---|---|---|
| II | 0.4 | 1.4 | 11 | 57 | 40 | 4 | 95 | |
| III | 1.0 | 3.5 | 12 | 60 | ([2]) | 4 | 93 | |
| IV | 0.5 | 2.0 | 4 | 70–80 | 35 | 4 | 83 | |
| V | 0.2 | 1.2 | 2–3 | 50–70 | 45 | 3.5 | 82 | Cl analysis 35.7 percent; theory 37.35. |
| VI | 0.5 | 1.75 | 3–5 | 50–55 | 30 | 5.5 | 66 | |
| VII | 0.5 | 1.75 | 11 | 60 | 20 | 4.5 | 81 | Cl analysis 35.88 percent; theory 37.35. |

[1] A = 1,1-dichloro-2-phenylcyclopropane.
[2] 2¼ hours.

References Cited

UNITED STATES PATENTS 3,522,302   7/1970   Kaiser _____ 260—543

OTHER REFERENCES

Wagner, Synthetic Organic Chem., p. 822.

LEWIS GOTT, Primary Examiner

E. J. GLEIMAN, Assistant Examiner

U.S. Cl. X.R.

252—8.1; 260—999